(12) United States Patent
Khanna et al.

(10) Patent No.: US 7,643,488 B2
(45) Date of Patent: Jan. 5, 2010

(54) METHOD AND APPARATUS FOR SUPPORTING MULTIPLE CUSTOMER PROVISIONED IPSEC VPNS

(75) Inventors: Bakul Khanna, Lexington, MA (US); Ramasamy Jesuraj, Westford, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 329 days.

(21) Appl. No.: 11/540,198

(22) Filed: Sep. 29, 2006

(65) Prior Publication Data

US 2008/0092229 A1    Apr. 17, 2008

(51) Int. Cl.
*H04L 12/28* (2006.01)
(52) U.S. Cl. ........................................ 370/392; 370/401
(58) Field of Classification Search .................. None
See application file for complete search history.

(56) References Cited

U.S. PATENT DOCUMENTS 7,116,665 B2 * 10/2006 Balay et al. .................. 370/392
2005/0188106 A1 * 8/2005 Pirbhai et al. ................ 709/238
2005/0286441 A1 * 12/2005 Huang ......................... 370/254
2006/0198368 A1 * 9/2006 Guichard et al. ............. 370/389
2006/0291473 A1 * 12/2006 Chase et al. ............... 370/395.5
2007/0206597 A1 * 9/2007 Asati et al. ................... 370/392

* cited by examiner

*Primary Examiner*—Hong Cho
*Assistant Examiner*—Eunsook Choi
(74) *Attorney, Agent, or Firm*—Anderson Gorecki & Manaras LLP (57) ABSTRACT

Customer Traffic may be segregated using customer provisioned IPSec VPNs implemented using group security association for IPSec tunnels, by causing the CE network element to implement multiple VRFs for the several VPNs, each of which may be used for a different segment of the customer's traffic. The CE network element may implement a single MPBGP peering session with the GCKS/RR for all VPNs, and may establish secure data channels for each of the VPNs based on the group security associations for each of the VPNs. Although a common MPBGP peering session may be used, routing information for the several VRFs may be separated by applying per-VRF import policies at the CE, so that each VPN only has access to routes intended to be advertised to that VPN.

14 Claims, 6 Drawing Sheets

METHOD AND APPARATUS FOR SUPPORTING MULTIPLE CUSTOMER PROVISIONED IPSEC VPNS

CROSS REFERENCE TO RELATED APPLICATIONS

This application is related to U.S. Patent Application entitled Method And Apparatus For Learning Endpoint Addresses of IPSec VPN Tunnels, filed on even date herewith, the content of which is hereby incorporated herein by reference.

BACKGROUND OF THE INVENTION

1. Field of the Invention

The present invention relates to communication networks and, more particularly, to a method and apparatus for supporting multiple customer provisioned EPSec VPNs.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements. Two networks with the same network topography may operate in completely different ways depending on the particular protocols selected to enable the network elements to interoperate.

Figure 1:
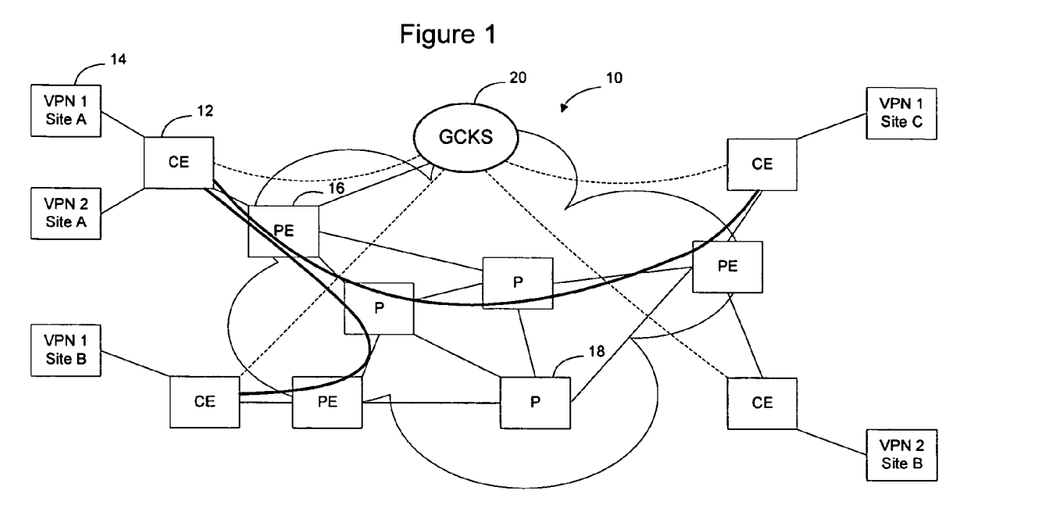
FIG. 1 is a functional block diagram of a portion of an example communication network.

FIG. 1 illustrates an example communication network 10 in which VPN tunnels may be established to interconnect CEs connected to one or more VPN sites. As shown in FIG. 1, a service provider provides interconnectivity amongst Customer Edge (CE) network elements 12. A CE device 12 is a device which connects one or more VPN sites 14 to a Provider Edge node 16. Essentially, a CE device allows one or more VPN sites to interconnect with an external network so that one or more VPN sites may be interconnected over the communication network 10.

A Provider Edge (PE) node is a router which connects to one or more CE devices using a dynamic routing protocol to exchange CE reachability information. The PE connects with at least one other PE or P node. When handling Internet Protocol (IP) MultiProtocol Label Switched (MPLS) traffic, a PE node acts as a Label Edge Router which terminates Label Switched Path (LSP) tunnels used to forward traffic to other PE nodes. PE nodes may be directly connected to other PE nodes, or may be connected through other network elements such as backbone routers 18.

Backbone routers 18 are commonly designated in the industry by the letter P. The Provider "P" routers are backbone routers which provide interior gateway protocol connectivity between PE nodes. It may be possible for a given router to act as a PE node for some VPNs and as a P router for other VPNs, however, depending on the configuration of the communication network.

A Virtual Private Network (VPN) may be formed by securing communications between two or more networks or network elements to form a VPN tunnel, such as by encrypting or encapsulating transmissions between the networks or network elements. Using VPN tunnels enables geographically dispersed VPN sites to exchange information securely without obtaining dedicated resources through the network.

There are several common ways of establishing VPN tunnels on a network. For example, VPNs may be implemented at the Provider Edge (PE) network elements to allow the service provider to provision VPN services on behalf of the network customers. One common way to do this is described in Internet Engineering Task Force (IETF) Request For Comments (RFC) 2547, the content of which is hereby incorporated herein by reference. RFC 2547 describes a VPN architecture in which MultiProtocol Label Switching (MPLS)—based tunnels are used to forward packets over the network backbone. A protocol referred to as Border Gateway Protocol (BGP) is used to distribute routes over the backbone for VPNs provisioned through a particular PE network element. Routing information for the Provider-Provisioned VPNs is stored in a VPN routing and forwarding table (VRF) or a distinguishable area of the PE's common VRF.

A VPN also may be established by customers themselves independent of the provider by deploying CE network elements configured with VPN software. One common way to implement a CE-based VPN is to create Internet Protocol Security (IPSec) tunnels through the communication network. An IPSec based VPN uses point-to-point IPSec tunnels formed using an EPSec Security Association (SA) between every pair of CEs that are connected to VPN sites on the VPN. As the number of VPN sites grow, this point-to-point solution does not scale, since the number of SAs required to implement the VPN will increase on the order on $n^2$. To overcome this, it is possible to use a group SA to enable all tunnels between the CEs on the VPN to use the same security association. A Group Controller Key Server (GCKS) may be used to manage the group security association for the VPN.

In a CE-based VPN, to enable devices on one VPN site to communicate with devices on another VPN site via an IPSec VPN tunnel, it is necessary to exchange VPN routing information between the two CEs connected to the VPN sites. The routing information enables the CEs to learn which VPN addresses may be reached via the VPN. As VPN sites and network elements are added and removed from the networks, the new routing information will be advertised to the other CEs connected to participating sites in the VPN.

Where MultiProtocol Border Gateway Protocol (MPBGP) is being used to distribute VPN routing information on a VPN, a given CE will establish an MPBGP peering session with every other CE with which it would like to exchange routing information. Where there are many CEs in the VPN, the GCKS may also serve as a route reflector to enable BGP routes to be exchanged between the various CEs by causing each CE to establish a single peering session with the route reflector, which will then distribute the routes to the other CEs.

Although the GCKS model of CE based VPNs is a single customer solution and supports a single VPN today, at times it may be desirable for a customer to be able to segregate traffic so that not all data is available to all users of the customer's network. For example, in a large corporation it may be desirable to segregate traffic between departments, so that each department is able to communicate securely without enabling other people in the company to have access to the data. An example of this may be where human resources has sensitive personal information about the corporation's employees that should not be made available to other persons within the corporation.

One way to implement multiple VPNs using a given CE is to cause the CE to instantiate multiple Virtual Routers, each of which may be used to handle traffic for a different VPN. A virtual router is a software construct in a physical router that has all the attributes of a physical router, but which shares processor time, switch plane resources, and other physical resources of the physical router. Because the virtual router is logically separate from other virtual routers, it has its own routing space, its own policy information, and is able to be provisioned much the same as any other router on the network. Virtual router based VPNs (VR-based VPNs) are described, for example, in an IETF Internet-Draft by Paul Knight, et al., entitled "Network-based IP VPN Architecture using Virtual Routers," July 2002, the content of which is hereby incorporated herein by reference.

Conventionally, the use of virtual routers to implement multiple CE-based VPNs has required the CEs to obtain Security associations with multiple other CEs on a per-CE pair basis. Additionally, since the virtual routers are independent processes, each virtual router is required to exchange routing information with the other sites in its VPN. Thus, although multiple virtual routers may be used to implement multiple CE-based IPSec VPNs to segregate customer traffic, it would be advantageous to provide another way in which traffic for a given customer may be segregated using customer provisioned VPNs.

SUMMARY OF THE INVENTION

Traffic may be segregated using customer provisioned IPSec VPNs implemented using IPSec tunnels, by causing the CE network element to implement multiple VRFs for the several VPNs, each of which may be used for a different segment of the customer's traffic. The CE network element may implement a single MPBGP peering session with the GCKS/RR for all VPNs, and may establish unique secure data channels for each of the EPSec VPNs. Although a common MPBGP peering session may be used, routing information for the several VRFs may be separated by applying per-VRF import policies at the CE, so that each VPN only has access to routes intended to be advertised to that VPN. Thus, a single secure control channel between each CE and the GCKS/RR may be used to exchange routing information for all VPNs associated with the customer, while enabling different group security associations for each of the VPNs to be established so that traffic within the several VPNs may be kept secure.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 2:
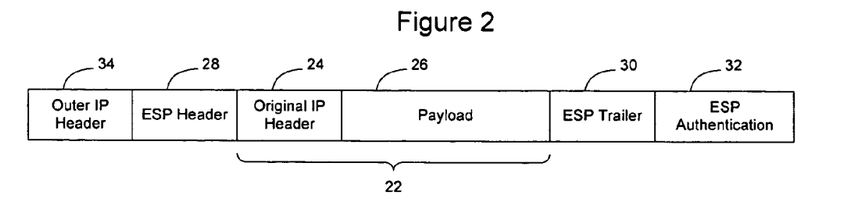
FIG. 2 is a functional block diagram of an encrypted IP packet.

FIG. 2 shows an IPSec encrypted IP packet that may be used to transfer data over an IPSec secure tunnel. As shown in FIG. 2, an original IP packet 22 includes the original IP header 24 and the original payload 26. When the packet is encrypted according to the IPSec standard, the encryption algorithm will add an Encapsulated Secure Payload (ESP) header 28, an ESP trailer 30, and an ESP authentication field 32. The new packet will also be provided with a new outer IP header 34 that will be used to route the encrypted packet across the network. IPSec is well documented and, accordingly, a detailed explanation of how IPSec works will not be provided herein.

Figure 3:
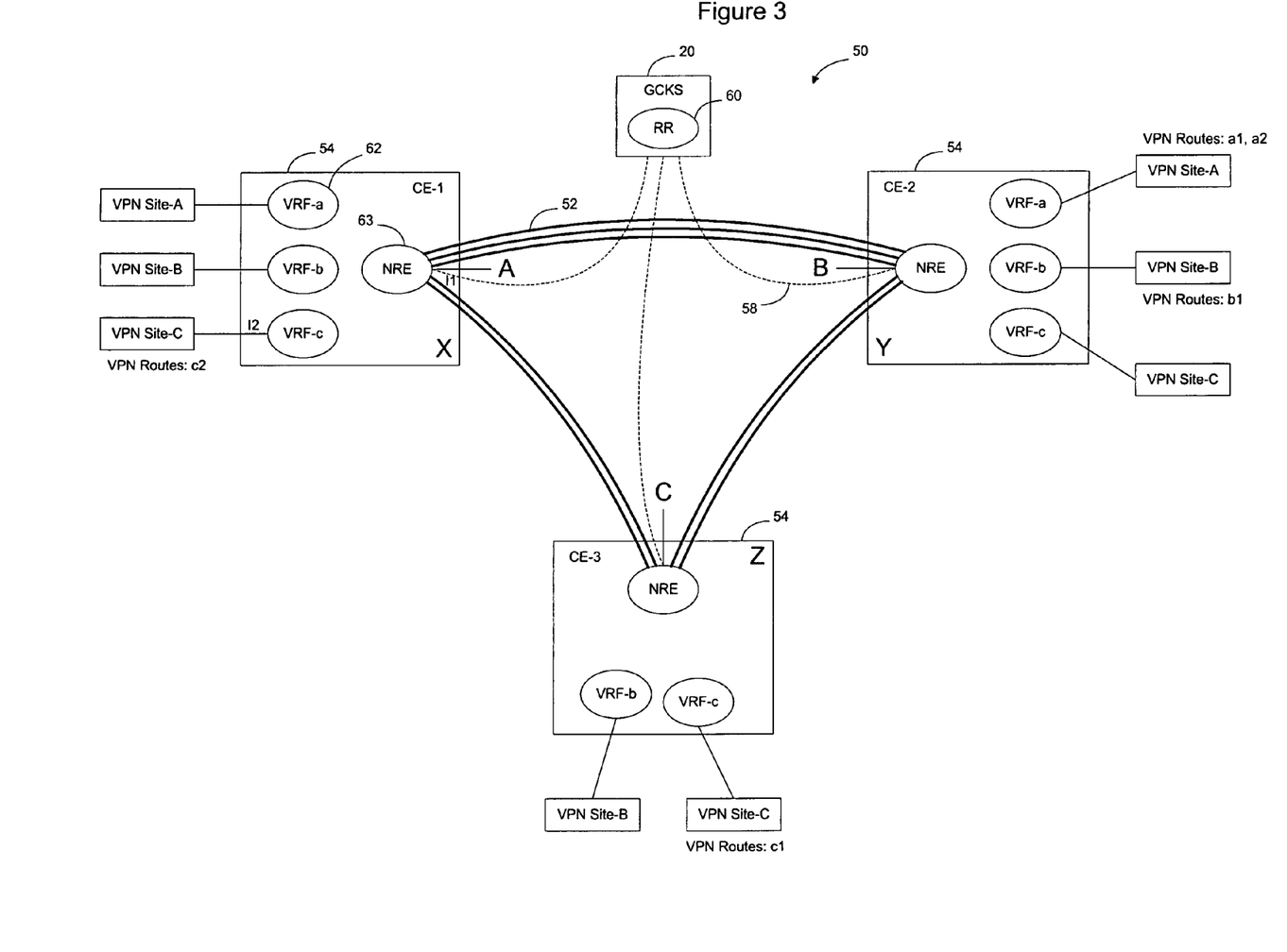
FIG. 3 is a functional block diagram of a communication network according to an embodiment of the invention.

FIG. 3 illustrates an example communication network 50 in which VPN tunnels 52 have been configured between CE network elements 54. Addresses A, B, C, and D are the public addresses of the CEs 54 and the GCKS 20, and are also the IPSec tunnel endpoints for secure data channels (tunnels 52) that extend between the VPN sites. A secure control channel 58 extends between the GCKS 56 and each of the CEs 54. According to an embodiment of the invention, each CE network element may implement multiple VRF processes (one for each VPN site attached to the CE) to enable customer traffic to be separated, while using a common secure control channel to handle routing information for the customer.

When a CE comes up, the CE will register with the GCKS 56 and establishes a secure control channel 58 with the GCKS. The secure control channel is represented as an unnumbered IP interface on the CE and terminates at the Network Routing Engine (NRE) on the CE. The NRE, in this context, is a Linux process containing the routing protocols and routing table for the service provider network. The NRE may be configured to operate as specified in IEEE RFC 2547. A single BGP session runs between each CE and the GCKS over the secure control channel 58 regardless of the number of VPNs (VRFs) at the CE.

For each Virtual Routing and Forwarding (VRF) 62 the CE 12 will establish a secure data channel 52, which may be implemented as an IPSec tunnel. Each VPN will have a separate group secure association (key) obtained from the GCKS that will be used to encrypt data on the secure data channel for that VPN. The secure data channel is also represented as an unnumbered IP interface that terminates at the NRE. The NRE in the CE maintains a mapping between import Route Target (RT) to VRF to enable the NRE to populate the correct VRFs with the VPN routes received from other CEs.

In the network shown in FIG. 3, MPBGP may be used by the CEs to exchange routes (i.e. via the route reflector 60), although the CEs may also exchange routes with each other directly via individual peering sessions. The MP-BGP extension for ipv4-vpn route exchange may be used in this context to exchange routes between the CEs directly or via the route reflector.

The VRFs maintain routing tables for routes that are relevant to their segregated section of the customer traffic. For example, as routes are received from the route reflector, the NRE will direct the routes to the correct VRF according to the route target contained in the route. In MPBGP, a route generally has three parts—a route distinguisher which ensures uniqueness of IP routes in the presence of overlapping IP addresses between VPN sites, a next hop value, and a route target that designates the VLAN or VPN to which the route belongs. When a route is received, the NRE may use the route target value to identify which VRF should receive the route advertisement so that the routing table for that VRF may be updated to include the new route.

Table 1 shows the per-VRF routing tables after receipt of the routing updates shown in FIG. 3 (i.e. after receipt of routes <RDa:a1, B, RTa>; <RDa:a2, B, RTa>; <RDb:b1, B, RTb>; <RDc:c1, C, RTc>).

TABLE 1

| Per-VRF routing table for VRF-a at CE1 after registration with GCKS | | Per-VRF routing table for VRF-b at CE1 after registration with GCKS | | Per-VRF routing table for VRF-c at CE1 after registration with GCKS | |
| --- | --- | --- | --- | --- | --- |
| Prefix | Interface/ next hop | Prefix | Interface/ next hop | Prefix | Interface/ next hop |
| A1 | B | B1 | B | C1 | C |
| A2 | B | | | C2 | I2 |

As may be seen from Table 2, the per-VRF routing tables enable different portions of the customer's network to be segregated by causing only those routes relevant to the VPN to be imported into the VRF for that VPN, while enabling a single MPBGP session to be used to exchange routing information for all of the VPNs supported by the CE.

The NRE will also maintain routing tables so that it is able to direct traffic being handled by the CE. Once the CE has registered with the GCKS and established the secure control channel, the interface table in the NRE will contain an entry for the secure control channel. As the VRFs register with the GCKS, the interfaces will be added to the interface table in the NRE. Ultimately, once the secure control channel with the GCKS and the secure data channels have been established for each of the VRFs, the NRE interface table will include a mapping between the interface name and the interface ID for each of the secure control channels, secure data channels, and local interfaces. Interfaces may be logical or physical, and the network element will implement other processes to handle traffic based on the definition of the particular interface for particular traffic.

Figure 4:
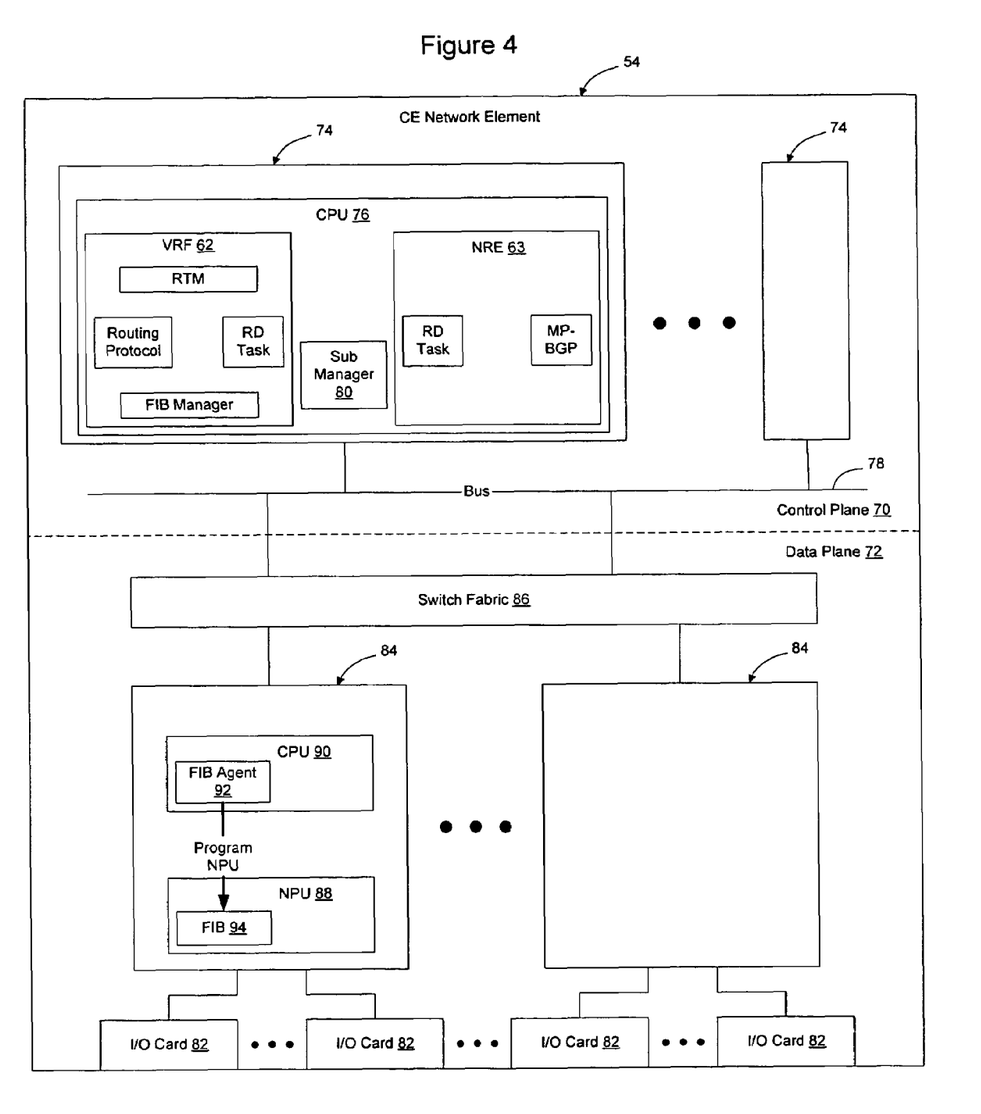
FIG. 4 is a functional block diagram of a CE network element according to an embodiment of the invention.

FIG. 4 shows an example of a CE network element 54 that may be configured to implement an embodiment of the invention. As shown in FIG. 4, the CE network element 54 generally includes a control plane 70 and a data plane 72. The control plane 70 is configured to control operation of the network element 54 by specifying how the data plane 72 should handle particular packets or classes of packets. The control plane generally includes control service cards 74, each of which includes one or more processors such as a CPU 76. A bus 78 may be provided to interconnect the control service cards 74 to enable data and instructions to be communicated between the CPUs 76 in the control plane 70. The CPUs may host VRFs 62, NRE 63, and other applications such as the sub-manager 80.

The network element 54 also includes a data plane 72 configured to handle packets of data on the communication network. The data plane 72 generally includes one or more Input/Output (I/O) cards 82, one or more data service cards 84, and a switch fabric 86. Packets received over the I/O cards 82 are passed to the data service cards 84, and then to the switch fabric 86. The switch fabric 86 enables a packet entering on a port on one or more I/O cards 82 to be output at a different port in a conventional manner. A packet returning from the switch fabric 86 is received by one or more of the data service cards 84 and passed to one or more I/O cards 82. The packet may be handled by the same data service card 84 on both the ingress and egress paths or may be handled by different data service cards 84 on the ingress and egress paths.

The I/O cards 82 are configured to connect to links in the communications network 50. The I/O cards 82 may include physical ports, such as optical ports, electrical ports, wireless ports, infrared ports, or ports configured to communicate with other physical media, as well as configurable logical elements capable of being programmed to implement interface definitions. An interface may encompass one or more physical ports or may have a different definition.

The data service cards 84 include one or more network processors 88 configured to perform network processing on packets of data received via the I/O cards. The data service cards 84 also may include a CPU 90 configured to host applications such as a FIB agent 92 that may be used to program the network processing unit 88. For example, the FIB agent 92 may be configured to program the NPU 88 to implement particular rules in the Forwarding Information Base 94. The invention is not limited to the particular manner in which the data plane is architected, as many different data plane architects may be used to implement embodiments of the invention.

The VRF 62 and NRE 63 may implement processes to enable them to implement route updates to cause new routing information to be programmed into the data plane. For example, the NRE may include a MultiProtocol (MP) BGP process to advertise and receive advertised routs. The NRE may also include a Route Designator (RD) Task process which is configured to obtain the correct Virtual Router ID for a given import Route Target (RT) when a BGP route update is received.

The VRF 62 may include a RD Task process configured to filter routes by applying a per-VRF route import and route export policy. The RD Task may be configured to implement the export policy described above to implement an embodiment of the invention. The VRF also may include a Routing Protocol process configured to forward routing updates to the VPN sites 14 and receive route updates from the VPN sites. The VRF may also include a Real Time Manager process configured to manage the creation of interfaces on the network element.

In the embodiment shown in FIG. 4, the VRF includes a FIB Manager process that is configured to interface with a FIB agent 92 in the data plane to program the routes into the FIB in the data plane. By programming routes into the FIB, data that is received by the network element may be forwarded using the rules in the FIB.

Although a particular embodiment of a network element has been described, the invention is not limited in this manner as other types of network elements may be used as well. Accordingly, the embodiment shown in FIG. 4 is to be taken as illustrative only, and not to be interpreted as the only way of implementing the invention.

Figure 5:
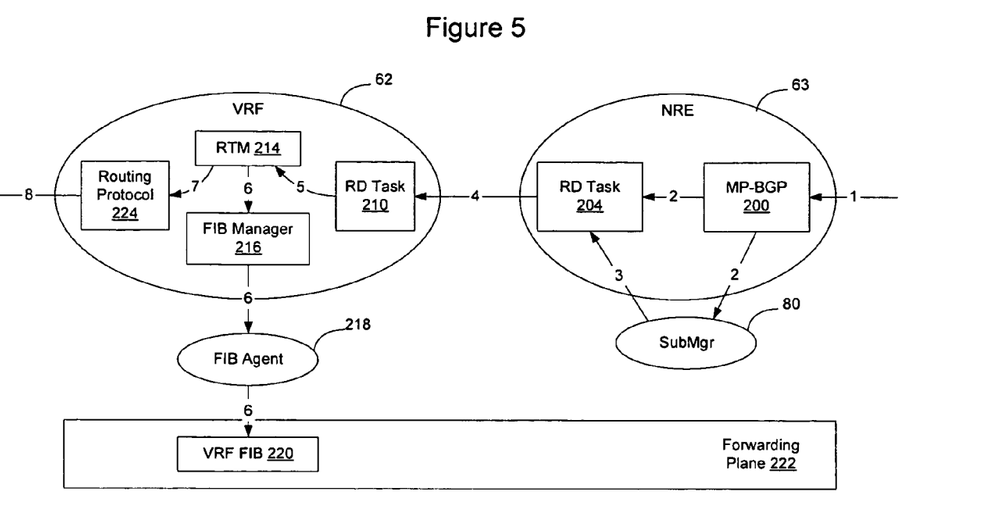
FIG. 5 is a functional block diagram showing the FIB download process at a CE network element for remote VPN routes according to an embodiment of the invention.

FIG. 5 shows an example of how the example network element of FIG. 4 may handle routing updates received from a service provider's network to implement an embodiment of the invention. As shown in FIG. 5, when a route advertisement is received, it is sent to an MP-BGP process 200 in the NRE 63 (arrow 1). The MP-BGP process receives MPBGP updates from its remote peer and applies global import policies to filter routes. Route updates, in this context, may be expected to have the format <RD:prefix, BGP-nh, RT> in which RD is the route distinguisher (enables uniqueness of IP route in the presence of overlapping IP addresses between VPN sites), BGP-nh is the next hop for the route, and RT is the route target. In a provider provisioned VPN, the route target is generally used to identify the VPN to which the route belongs. According to an embodiment of the invention, the RT of the route advertisement is used instead to identify the segregated area of a subscriber's VPN.

The MP-BGP process will then pass the route updates (arrow 2) to the Route Designator task (RD-Task 204). The RD-task uses the import route targets (RT) of the route updates in the BGP route advertisement to obtain the Virtual Router IDs (VrIDs) for the RTs of the route update. The RD-task then sends a request to the SubMgr 206 to retrieve the secure data channel interface IDs (SDC-IP-IfId(s)) for these VrIds (arrow 3).

The SubMgr 80 uses the VrID as a key to look up the corresponding secure data channel Interface IDs (SDC-IP-IFIds), and replies with the list of SDC-IP-IfIds. If no corresponding SDC-IP-IfIds is found for a particular VrID, then no secure data channel exists for this route, and hence there is no corresponding VRF that should receive the route update. Accordingly, in this instance, the NRE will not forward the route to any VRF. Although an embodiment is shown in FIG. 5 in which the RD-task accesses the SubMgr 206 to obtain a list of SDC-IP-IfIds, the invention is not limited in this manner as the RD-task may be configured to retain and dynamically update this list as well.

The RD task then filters the routes by applying a per-VRF VPN route import policy so that only those routes that the VRFs are supposed to learn about are forwarded to the VRFs. The RT-task will then replace the RT with the interface ID (SCD-IP-IfId) and forward the route to the appropriate VRF (s). The route, at this point, may be represented as <RD: prefix, BGP-nh, SDC-IP-IfId>, in which the RT values that were included in the original route updates have been replaced with the secure data channel interface IDs.

Routes forwarded by the VRF are received by RD-Task processes 210 in the VRFs 62. Upon receipt of a route update, the RD task process will send the route to the Route Table Manager (RTM) process 214 which will interface a FIB manager process 216 to cause the route to be programmed into the forwarding tables. The FIB manager 216 will instruct a FIB agent 218 to program the VRF forwarding information base 220 in the network elements forwarding plane 222, by causing the route to be programmed into the FIB in the forwarding plane. Thus, when subsequent packets are received that identify the route, the forwarding plane may forward those packets to the correct IPSec tunnel interface as defined by the SDC-IP-IfId associated with the route update. The route will also be passed to a routing protocol process 224 in the VRF that will announce the routes to those network elements on the VPN site that are part of the segment represented by the VRF according to the VRF's export policy.

Figure 6:
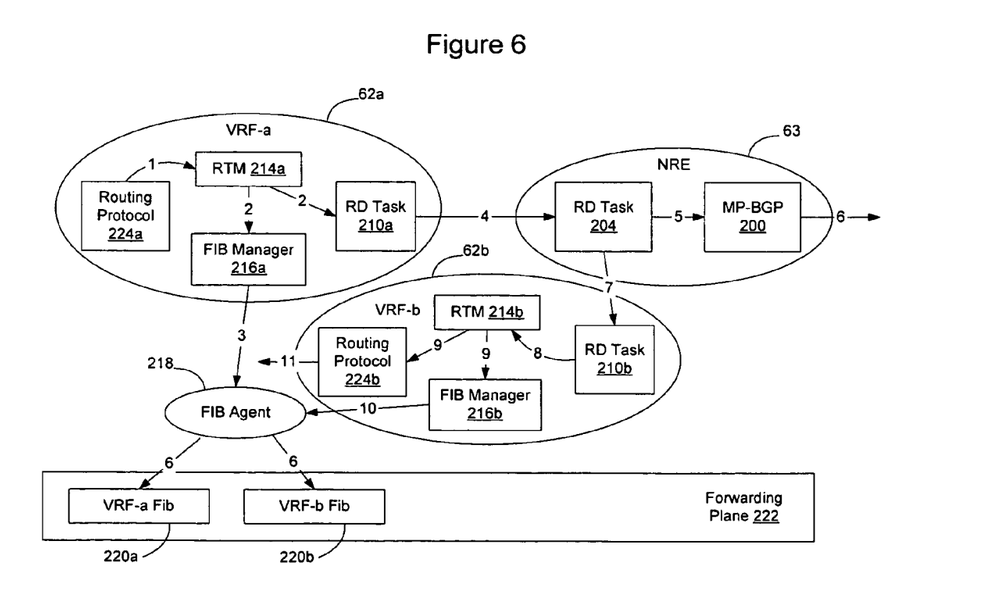
FIG. 6 is a functional block diagram showing the FIB download process at a CE network element for local VPN routes according to an embodiment of the invention.

FIG. 6 shows a process that the network element may follow when it receives a local route from an attached VPN site. As shown in FIG. 6, when the routing protocol process 224a receives a route, it will apply local import policy filters to the route before it is accepted. If accepted, the route will be passed to the RTM (arrow 1) which will cause the route to be programmed into the forwarding plane by passing the route to the FIB manager 216a (arrow 2). The FIB manager programs the route into the forwarding plane 220 via FIB agent 218 (arrow 3).

The route will also be passed to the RD Task process 210a which will filter the routes based on export policy. If the route is to be advertised from the VRF, the RD task will send the route to the NRE process on the network element (arrow 4). The route will be received by the RD task process 204 in the NRE and passed to the MP-BGP process 200 in the NRE (arrow 5). The MP-BGP process 200 creates a route in MPBGP format, filters the routes by applying export policy, and then distributes the routes to remote VPN peers (arrow 6). The RD-task process will also leak routes, if necessary, to other VRFs in the network element (arrow 7). These other VRFs will follow a process similar to the one described above in connection with FIG. 5, to cause the leaked routes to be programmed into their FIBs 220 in the forwarding plane 222. Specifically, the RD-task processes in the other VRFs will apply per-VRF VPN route import policy and selectively downloading routes via their FIB manager to the FIB agent 218 so that they may be programmed into the forwarding plane.

Figures 7, 8:
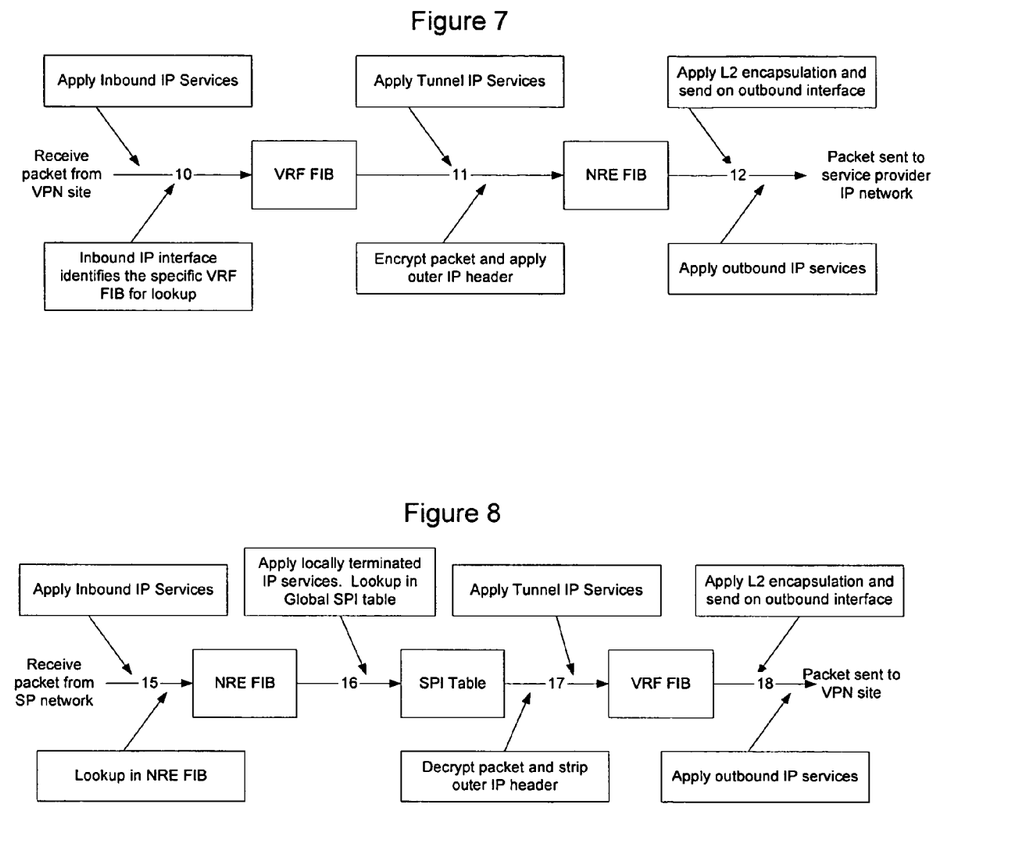
FIGS. 7 and 8 illustrate example processes showing how data packets may be processed by a network element configured according to an embodiment of the invention.

FIG. 7 illustrates a process that the network element may follow when transmitting a data packet from an attached VPN site onto the service provider's network. As shown in FIG. 7, when a packet is received (arrow 10) the network element will apply inbound IP services, and the inbound IP interface will identify the specific VRF FIB for lookup for that packet. The packet will then be passed to the identified VRF FIB. After the packet has been filtered by the VRF FIB, the network element will apply tunnel IP services, encrypt the packet, and apply the outer IP header (arrow 11). The format of the packet at this point is shown in FIG. 2. The packet will then be passed to the NRE FIB, after which the network element will apply L2 encapsulation and send the packet to an outbound interface. The outbound interface will apply outbound IP services and forward the packet onto the service provider's IP network (arrow 12)

When a packet is received from the Service Providers IP network (FIG. 8) the network element will apply inbound IP services and perform a lookup in the NRE FIB (arrow 15). After the NRE FIB lookup, the network element will apply locally terminated IP services and perform a lookup in the global SPI (Service Provider Interface) table to determine the interface ID for the packet (arrow 16). The network element will then decrypt the packet, strip off the outer IP header, and apply tunnel IP services (arrow 17). The packet will be passed to the VRF FIB and then sent to the VPN Site (arrow 18). As the packet is sent to the VPN site, the network element will apply L2 encapsulation and outbound IP services.

Figure 9:
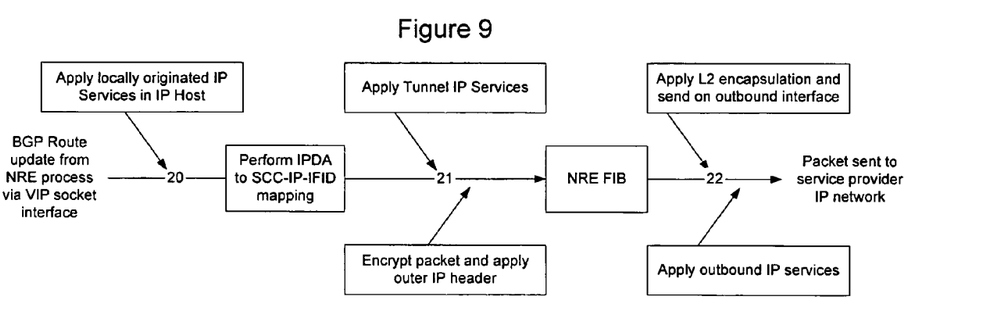
FIGS. 9 and 10 illustrate example processes showing how route updates may be processed by a network element configured according to an embodiment of the invention.

FIG. 9 illustrates a process that the network element may follow when it receives a BGP route update (arrow 20) from the NRE process via a VIP socket interface. As shown in FIG. 9, when a BGP-route update is received from the NRE process, the network element will apply locally originated IP services in the IP host. The network element will also perform IP Destination Address to Secure Control Channel IP Interface ID (SCC-IP-IfId) mapping (arrow 21). Thus, based on the IP DA in the packet, the IP Host process will send the BGP packet to the SCC tunnel context for encryption and outbound processing (Arrow 21). The network element will then apply outbound IP services, apply L2 encapsulation, and send the BGP route update on the outbound interface for the SCC (arrow 22).

Figure 10:
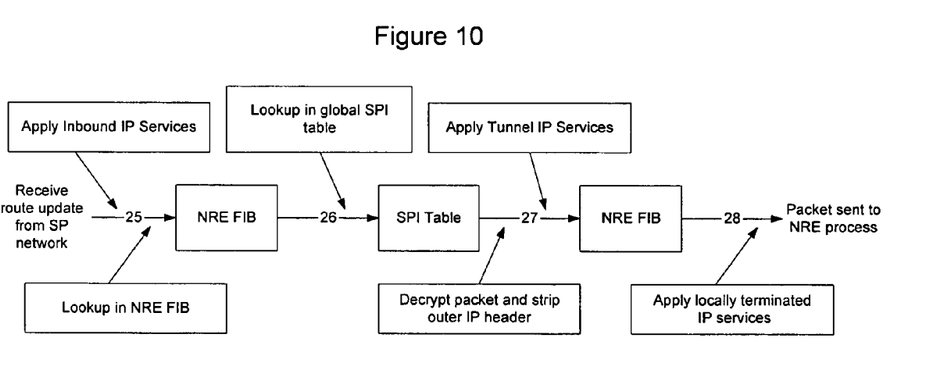

FIG. 10 illustrates a process that the network element may follow when it receives a routing update from the service provider's network. As shown in FIG. 10, when a control packet is received from the service provider's network, inbound IP services are applied and the network element will perform a lookup in the NRE FIB (arrow 25). The network element will then perform a lookup in the global SPI table to determine the Interface ID (arrow 26). The network element then will decrypt the packet and strip off the outer IP header and apply tunnel IP services (arrow 27). Then, locally terminated IP services will be applied to the packet in the IP host and the packet will be sent to the NRE process. The BGP route update will then be sent to the NRE process via the VIP socket interface.

FIGS. 7-10 have provided several specific examples of how a network element, such as the network element of FIG. 4, may handle data packets and routing updates. The invention is not limited to the particular example processes illustrated in these Figures, however, since other network elements that are differently configured may handle data and routing packets differently according to their particular architecture.

The functions described above may be implemented as one or more sets of program instructions that are stored in a computer readable memory within the network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

We claim:

1. A method of supporting multiple customer provisioned Virtual Private Networks (VPNs) in a scalable manner, the method comprising the steps of:

instantiating, by a Customer Edge (CE) network element, a Virtual Routing and Forwarding (VRF) process for each of the customer provisioned VPNs to be supported by the CE network element;

establishing, by the CE network element, a separate Internet Protocol Security (IPSec) secure data channel for each VPN to be supported, by obtaining a shared group security association for each VPN from a Group Controller Key Server (GCKS); and instantiating, by the CE network element, a Network Routing Engine (NRE) process configured to interact with the VRF processes, the NRE process maintaining an interface table containing a mapping between VRF name and interface ID for each of the secure control channels, secure data channels, and local interfaces.

2. The method of claim 1, further comprising the step of establishing, by the CE network element, a secure control channel with a route reflector associated with the GCKS, said secure control channel being configured to carry routing information between CE and the route reflector for the multiple VRF processes instantiated on the CE.

3. The method of claim 1, wherein each of the VPNs supported by the CE network element are associated with one Local Area Network.

4. The method of claim 1, wherein each VRF process is configured to apply its own route import policy to create a per-VRF routing table.

5. The method of claim 4, wherein the per-VRF routing tables comprise tables correlate route information with interface next hop values.

6. The method of claim 5, wherein the per-VRF routing tables are different for the several VPNs.

7. The method of claim 1, wherein each VRF process is configured to program routes into a forwarding plane of the CE to enable the CE to use the routes in connection with traffic for the VPN associated with the VRF.

8. The method of claim 1, wherein the NRE process is further configured to selectively leaking routes between VRFs.

9. A network, comprising:

a plurality of CE network elements interconnected by a provider network, at least some of the CE network elements being connected to more than one Virtual Private Network (VPN) site, the CE network elements implementing a separate Virtual Routing and Forwarding (VRF) process for each VPN site to which they are attached and implementing a separate Internet Protocol Security (IPSec) secure data channel for each VPN site to which they are attached;

a GCKS accessible over the provider network and configured to provide group security associations to the CE network elements for use in creation of the secure data channels; and a route reflector accessible over the provider network and configured to perform route reflection on secure control channels between the route reflector and the CE network elements;

wherein the CE network elements are each configured to use one of the secure control channels to transmit routing information for each of the VRFs implemented on that CE network element, wherein the CE network elements instantiate Network Routing Engine (NRE) processes configured to interact with the VRF processes, each NRE process maintaining an interface table containing a mapping between VRF name and interface ID for each of the secure control channels, secure data channels, and local interfaces.

10. A Customer Edge (CE) network element, comprising:

a data plane configured to forward data traffic on a communication network; and a control plane configured to control a manner in which the data plane is configured to forward traffic on the communication network, the control plane containing at least one processor containing control logic that is configured to:

instantiate a plurality of Virtual Routing and Forwarding (VRF) process, each of the VRF processes being associated with a separate Virtual Private Network (VPN);

establish a separate Internet Protocol Security (IPSec) secure data channel for each VRF process using a group security association for the VPN associated with the VRF;

establish a secure control channel for use by all VRF processes between the CE and a routing peering point; and instantiate, by the CE network element, a Network Routing Engine (NRE) process configured to interact with the VRF processes, the NRE process maintaining an interface table containing a mapping between VRF name and interface ID for each of the secure control channels, secure data channels, and local interfaces.

11. The CE network element of claim 10, wherein the control logic is configured to receive the group security association for each VPN from a Group Controller Key Server (GCKS).

12. The CE network element of claim 10, wherein the routing peering point is a route reflector.

13. The CE network element of claim 12, wherein the route reflector is associated with the GCKS.

14. The CE network element of claim 12, wherein the secure control channel is configured to carry routing information between the CE and the route reflector for the multiple VRF processes instantiated on the CE.

* * * * *